United States Patent
Graeuler

(10) Patent No.: US 10,150,342 B2
(45) Date of Patent: Dec. 11, 2018

(54) COMPONENT ATTACHMENT WITH A TRANSVERSE FORCE-SUPPORTING SURFACE

(71) Applicant: ZF Friedrichshafen AG, Friedrichshafen (DE)

(72) Inventor: Dirk Graeuler, Belm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 15/111,549

(22) PCT Filed: Dec. 17, 2014

(86) PCT No.: PCT/EP2014/078142
§ 371 (c)(1),
(2) Date: Jul. 14, 2016

(87) PCT Pub. No.: WO2015/110230
PCT Pub. Date: Jul. 30, 2015

(65) Prior Publication Data
US 2016/0355065 A1      Dec. 8, 2016

(30) Foreign Application Priority Data

Jan. 22, 2014    (DE) .................. 10 2014 201 057

(51) Int. Cl.
*B60G 3/02*      (2006.01)
*B60G 3/20*      (2006.01)
(Continued)

(52) U.S. Cl.
CPC .............. *B60G 3/02* (2013.01); *B60G 3/202* (2013.01); *B60G 7/008* (2013.01); *B60G 7/02* (2013.01);
(Continued)

(58) Field of Classification Search
CPC . B60G 3/02; B60G 7/02; B60G 7/008; B60G 3/202; B60G 2206/82;
(Continued)

(56) References Cited

U.S. PATENT DOCUMENTS 2,939,720 A  *   6/1960  Wroby ................... B60G 99/00
                                                          267/293
2,962,279 A  *  11/1960  Wroby ..................... B60G 3/20
                                                          267/293
(Continued)

FOREIGN PATENT DOCUMENTS

DE        23 65 798 A1       5/1976
DE        38 01 640 C1       1/1989
(Continued)

OTHER PUBLICATIONS

German Search Report Corresponding to 10 2014 201 057.8 dated Dec. 11, 2014.

(Continued)

*Primary Examiner* — Paul N Dickson
*Assistant Examiner* — Timothy Wilhelm
(74) *Attorney, Agent, or Firm* — Davis & Bujold PLLC; Michael J. Bujold

(57) ABSTRACT

A component connection for a wheel suspension of a motor vehicle, with a control arm having a mounting, in particular a rubber mounting, at least at one of its ends. An inner sleeve and a connection component, in particular a wheel carrier, are fixed to one another by a fixing element. The fixing element presses a first contact surface of the inner sleeve, in the axial direction, toward the connection component against an abutment surface of the connection component. The connection component has a supporting surface against which a second contact surface of the inner sleeve rests. Furthermore, the supporting surface is inclined relative to (Continued)

the abutment surface in such a manner that transverse forces occurring, in the radial direction in the area of the mounting, can be supported.

16 Claims, 3 Drawing Sheets

(51) Int. Cl.
*B60G 7/00* (2006.01)
*B60G 7/02* (2006.01)

(52) U.S. Cl.
CPC ...... *B60G 2200/00* (2013.01); *B60G 2200/18* (2013.01); *B60G 2204/14* (2013.01); *B60G 2204/148* (2013.01); *B60G 2204/41* (2013.01); *B60G 2204/44* (2013.01); *B60G 2206/82* (2013.01); *B60G 2206/8207* (2013.01)

(58) Field of Classification Search
CPC ............ B60G 2206/22; B60G 2206/00; B60G 2206/8207; B60G 2200/18; B60G 2204/41; B60G 2204/148; B60G 2204/44; B60G 2204/14; F16F 1/387
See application file for complete search history.

(56) References Cited

U.S. PATENT DOCUMENTS

| | | | | |
|---|---|---|---|---|
| 4,609,315 A * | 9/1986 | Briles | ................ | F16B 19/1045 403/408.1 |
| 4,921,265 A | 5/1990 | Eyb et al. | | |
| 4,981,308 A | 1/1991 | Kunert et al. | | |
| 5,145,204 A | 9/1992 | Perkins | | |
| 5,238,262 A * | 8/1993 | Nunes | ................ | B60G 5/02 280/124.111 |
| 5,348,337 A * | 9/1994 | Ando | ................ | B60G 3/265 280/124.135 |
| 5,362,092 A * | 11/1994 | Schote | ................ | B60G 7/02 280/124.134 |
| 5,577,854 A * | 11/1996 | Jacob | ................ | B60G 7/00 280/93.508 |
| 5,980,174 A * | 11/1999 | Gallagher | ................ | F16B 5/01 29/897.32 |
| 6,305,699 B1 | 10/2001 | König | | |
| 6,729,611 B2 * | 5/2004 | Deschaume | ................ | B60G 7/02 267/140.12 |
| 7,914,021 B2 * | 3/2011 | Whitacre | ................ | B60G 7/02 280/86.756 |
| 8,807,902 B2 * | 8/2014 | Wang | ................ | F16B 37/061 411/353 |
| 9,428,031 B2 * | 8/2016 | Kuwabara | ................ | B60G 3/20 |
| 9,738,317 B2 * | 8/2017 | Iwamoto | ................ | B62D 21/11 |
| 2011/0127744 A1 | 6/2011 | Siebeneick et al. | | |
| 2015/0042059 A1 * | 2/2015 | Fiechtner | ................ | B60G 7/001 280/124.177 |
| 2017/0008558 A1 * | 1/2017 | Kruger | ................ | B60G 7/005 |

FOREIGN PATENT DOCUMENTS

| | | |
|---|---|---|
| DE | 196 13 212 A1 | 10/1997 |
| DE | 196 22 861 A1 | 12/1997 |
| DE | 10 2009 043 552 A1 | 4/2011 |
| DE | 10 2009 045 349 A1 | 4/2011 |
| DE | 10 2011 106 643 A1 | 1/2012 |
| DE | 10 2012 206 132 A1 | 10/2013 |
| EP | 0 317 727 A2 | 9/1988 |
| EP | 1 034 949 A2 | 9/2000 |
| FR | 2 258 279 A1 | 8/1975 |
| FR | 2 832 100 A1 | 5/2003 |
| FR | 2 982 531 A1 | 5/2013 |
| JP | H04-183622 A | 6/1992 |
| JP | H05-139131 A | 6/1993 |

OTHER PUBLICATIONS

International Search Report Corresponding to PCT/EP2014/078142 dated Mar. 4, 2015.
Written Opinion Corresponding to PCT/EP2014/078142 dated Mar. 4, 2015.

* cited by examiner

COMPONENT ATTACHMENT WITH A TRANSVERSE FORCE-SUPPORTING SURFACE

This application is a National Stage completion of PCT/EP2014/078142 filed Dec. 17, 2014, which claims priority from German patent application serial no. 10 2014 201 057.8 filed Jan. 22, 2014.

FIELD OF THE INVENTION

The present invention concerns a component connection. Furthermore, the invention concerns the use of a component connection in the chassis of a motor vehicle, as well as a method for producing a component connection, in particular in a chassis of a motor vehicle.

BACKGROUND OF THE INVENTION

In motor vehicle suspensions, in a generally familiar way, control arms are articulated to a wheel carrier, a vehicle body and/or an auxiliary frame. For this purpose, at least at one of their two ends the control arms have a mounting. Transverse control arms and track rods in particular are connected to the wheel carrier on the wheel side by way of a single-shear connection. In a single-shear connection an inner sleeve of the mounting is in contact at only one of its two ends in a single connection area with the wheel carrier and is detachably connected thereto by fixing means. Since the fixing means is primarily designed to absorb tensile forces, the disadvantage of this type of connection is that if transverse forces occur the fixing means bend, whereby the mountings begin to pull away from the wheel carrier. During this, the inner mounting sleeve lifts clear of the wheel carrier in one area, with the result that the kinematics of the wheel suspension are affected adversely since the components are no longer in contact with one another.

SUMMARY OF THE INVENTION

The objective of the present invention is achieved by the characteristics described below. Further advantageous design features emerge from the description below and from the drawings.

A component connection for a wheel suspension of a motor vehicle is proposed, which comprises a control arm, in particular a track rod and/or a transverse control arm, and a connection component, in particular a wheel carrier, a vehicle body and/or an auxiliary frame of a motor vehicle. These are connected detachably to one another by fixing means, in particular by a bolt and/or a screw. At least at one of its ends the control arm has a mounting, in particular a rubber mounting having an inner sleeve. The fixing means presses the inner sleeve in the axial direction, with a first contact surface facing toward the connection component, against an abutment surface of the connection component. This braces the mounting, particularly its inner sleeve, axially against the connection component. To decouple the fixing means from transverse forces that may act upon it, or at least to minimize their effect, the connection component has a supporting surface. The inner sleeve rests against this supporting surface with a second contact surface. Relative to the abutment surface, the supporting surface is inclined in such manner that by means of it, transverse forces that occur in the radial direction in the area of the mounting can be supported. Because of this, compared with connections known from the prior art, the mounting connection can absorb larger transverse forces without the component connection being pulled apart, i.e. even when loaded the contact surfaces or the supporting surface of the inner sleeve and the connection component remain in contact all over and no gap is produced between the components even temporarily so that they move relative to one another. Furthermore, by virtue of the support provided by the supporting surface the fixing means can be made smaller, whereby the space occupied and the manufacturing costs can be reduced.

It is advantageous for the supporting surface, in a longitudinal section of the component connection, to be directed parallel to the longitudinal axis of the fixing means. The transverse forces will then act perpendicularly to the supporting surface so that such forces can be absorbed in the best possible way for avoiding any gapings. Moreover, during the fitting of the component connection such an arrangement of the supporting surface in the radially perpendicular direction and parallel to the longitudinal axis enables the component connection to be fitted in a very simple manner. In this case, the inner sleeve can be introduced very quickly and simply along the longitudinal axis of the component connection into a recess in the connection component.

In a simply designed manner, the supporting surface on the connection component can be designed in that manner if the connection component has a preferably cylindrical recess. Into this extends the inner sleeve with its end facing toward the connection component. The recess is preferably of rotationally symmetrical design. Furthermore, the recess is preferably arranged coaxially with the longitudinal axis of the fixing means. Preferably, the diameters of the supporting surface of the connection component and of the second contact surface of the inner sleeve are the same nominal size. The components are preferably connected to one another with a fit, in particular a transition or interference fit. In the case of a clearance fit, the tolerance range is chosen such that there is hardly any play between the aforesaid components or the components can just be pushed together (by hand).

For the same reasons it is additionally or alternatively possible for the supporting surface to be formed by a lateral surface, in particular a cylindrical inner sidewall of the recess. Preferably, the lateral surface is parallel to and/or coaxial with the longitudinal axis of the component connection and the fixing means. In this way the force that results from the transverse forces acting in the radial direction relative to the fixing means, acts substantially perpendicularly to the lateral surface. Advantageously, by virtue of the supporting surface very high transverse forces can in this way be absorbed, allowing the fixing means to be made smaller.

In an advantageous further development of the invention, the first contact surface is formed at the component-side end of the inner sleeve i.e. its end facing toward the connection component. Preferably, the first contact surface is formed on the end face of the inner sleeve, and/or forms the end face. In addition it is advantageous if, in addition or alternatively, the abutment surface that corresponds to this first contact surface is formed on the inside of the recess. In this case the abutment surface is preferably formed by a bottom surface of the recess, particularly a circular one. This design of the component connection is particularly advantageous when the inner sleeve and/or the connection component are made of aluminum, since the diameter of the recess and the diameter of the component-side end of the inner sleeve can then be made relatively large. Advantageously, this enables the component connection to absorb relatively large forces before the aluminum, which is softer compared with steel, deforms.

Alternatively, particularly in the case of a steel pairing—i.e. when both the inner sleeve and the connection component are made of steel—it is advantageous for the first contact surface to be arranged a distance away in the axial direction from the component-side end of the inner sleeve, in particular by virtue of the supporting surface arranged between them. In this case it is additionally or alternatively advantageous for the abutment surface corresponding to the first contact surface to be outside the recess. Preferably, the abutment surface is formed by an outer surface of the connection component facing toward the inner sleeve. Thus, advantageously the connection area of the connection component can be made smaller, so that weight can be saved.

Particularly in combination with the features mentioned above, it is advantageous for the distance in the axial direction between the component-side end of the inner sleeve and its first contact surface to be smaller than the axial depth of the recess, so that there is some free space between the end of the inner sleeve and the bottom area of the recess. This can ensure that when the inner sleeve is braced against the connection component, the first contact surface is pressed intimately against the abutment surface of the connection component.

Particularly in relation to the above-mentioned further development of the invention, it is also advantageous for the supporting surface to be formed by a cylindrical shaft section, in particular an engagement section, that extends from the component-side end of the inner sleeve. In addition it is advantageous for the abutment surface to be formed, a distance away from the component-side end of the inner sleeve, by a step adjoining the shaft section. In this way the supporting surface and the abutment surface near it can be made very quickly and simply.

To simplify assembly, it is advantageous for the first contact surface and the abutment surface corresponding to it to be shaped conically, so that a bore of the connection component is orientated coaxially with the through-aperture of the inner sleeve. Thus, the fixing means for clamping those two components can advantageously be inserted very simply through the inner sleeve and screwed into the bore.

It is advantageous for the inner sleeve and/or the connection component to be made of steel and/or aluminum.

Likewise, it is advantageous for the fixing means to extend through the inner sleeve as far as a bore coaxial with the inner sleeve, into which the fixing means is preferably screwed. Consequently, the bore preferably has an internal thread. Furthermore, the fixing means is in particular designed as a bolt with an external thread at its end facing toward the connection component, so that it can be screwed into the internal thread of the bore.

To keep the production costs of the component connection as low as possible, it is advantageous for the recess and the bore to be made together as a unit, in particular a stepped bore. In other words, compared with the bore the recess has a larger diameter.

The component connection described earlier is thus particularly suitable for use as a component connection in the chassis of a motor vehicle between a control arm, especially a multi-point control arm, and a wheel carrier. In this case the multi-point control arm is preferably designed as a longitudinal and/or transverse control arm. Thus, the aforesaid multi-point control arms also include so-termed semi-trailing arms, which when designed for example as two-point arms, act both in the longitudinal and in the transverse direction (relative to the travel direction of the motor vehicle). Multi-point control arms include in particular two-point, three-point and even four-point control arms.

The invention also concerns a method for producing a component connection as described above. The component connection is used in particular in motor vehicle chassis, preferably between a wheel-guiding component, in particular a multi-point control arm, and a connection component, preferably a wheel carrier. The method is characterized by the steps described below, although the steps need not be carried out in the sequence indicated. Rather, the sequence described can be suitably varied so that the method can be adapted to the application concerned, enabling it to be carried out as efficiently and cost-effectively as possible.

First, an inner sleeve with at least a fixed outer diameter and at least one first contact surface is made. In addition, a frictional and/or interlocking connection of the inner sleeve with the wheel-guiding component (multi-point control arm) is established. Furthermore, the connection component is made with at least one contact surface and at least one supporting surface serving for the later connection to the wheel-guiding component and with a bore that fits the outer diameter of the inner sleeve. The particular feature of the production method is that the outer diameter of the inner sleeve and the diameter of the bore are nominally the same size. In relation to their inner and outer diameters the inner sleeve and the bore fit. To be able to connect the wheel-guiding component to the connection component, the two components are made and then positioned and held in relation to one another in such manner that the wheel-guiding component and the connection component have their contact surfaces and/or supporting surfaces against or in one another. During this, care should be taken that the longitudinal axes of the components are at least very nearly aligned. The components are connected to one another with interlock, the connection component is joined to the wheel-guiding component in particular by screwing. Suitable fits for the connection between the wheel-guiding component and the connection component are preferably a transition or an interference fit. These fits minimize or exclude any play, so that gaping is effectively prevented.

Preferably, the component connection is a single-shear connection. In this case the inner sleeve and the connection component share only a single connection area.

BRIEF DESCRIPTION OF THE DRAWINGS

Below, the invention is explained in more detail with reference to drawings, which show.

DETAILED DESCRIPTION OF THE PREFERRED EMBODIMENTS

Figure 1:
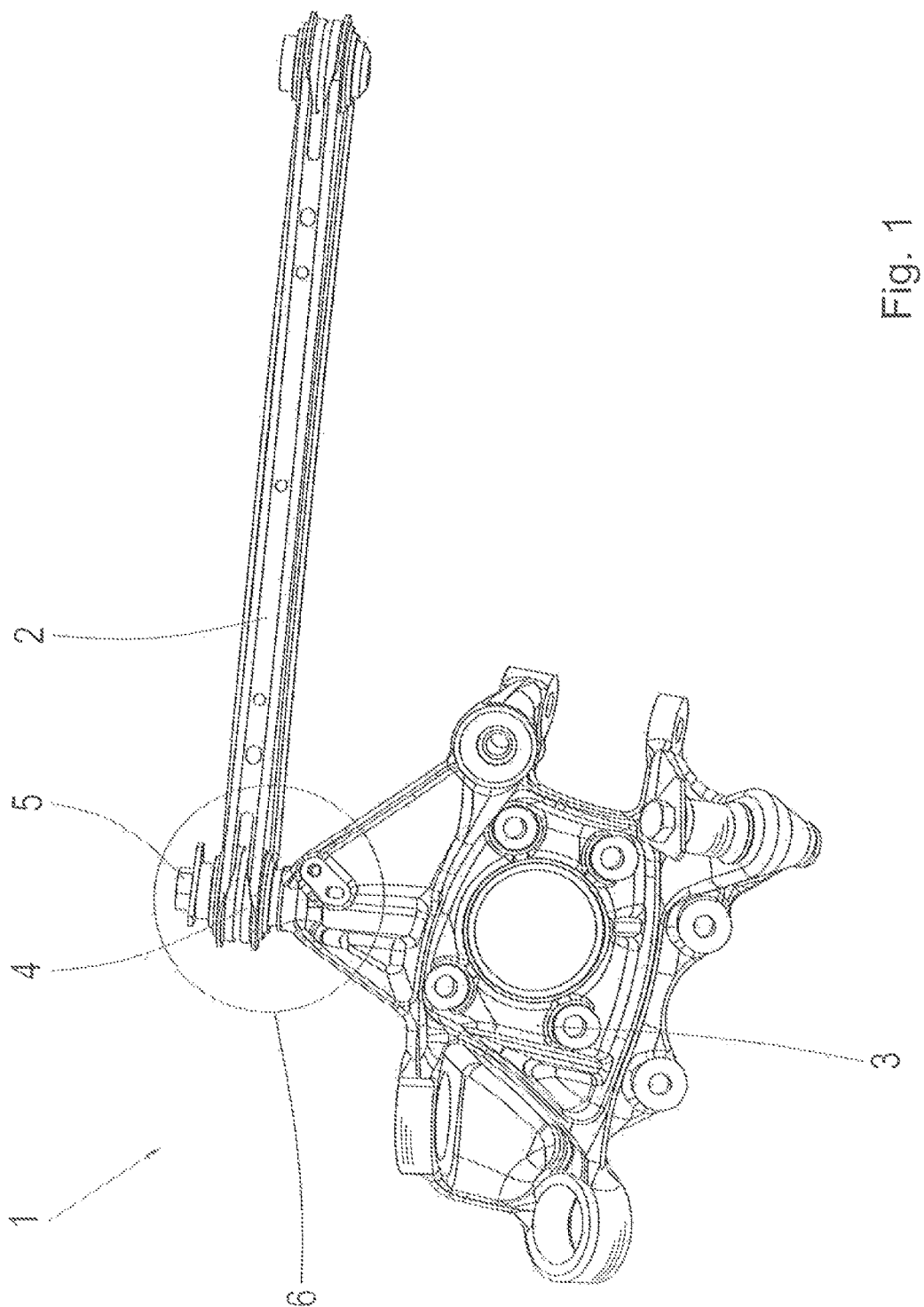
FIG. 1: A perspective view of a component connection with a control arm, which is detachably fixed to a wheel carrier by fixing means.

FIG. 1 shows a control arm arrangement 1, viewed in perspective. The control arm arrangement 1 comprises a control arm 2 and a connection component 3. In the example embodiment shown in FIG. 1, the connection component 3 is in the form of a wheel carrier. The control arm 2 is preferably a transverse control arm and/or a track rod. As shown in FIG. 1, the control arm 2 is articulated to the connection component 3 by means of a mounting 4. The mounting 4 is arranged on the end of the control arm 2 facing toward the connection component 3. In this area the control arm 2 has an eye in which the mounting 4 is held with interlock and/or by friction. In the area of the mounting 4 the control arm 2 is connected detachably to the connection component 3 or wheel carrier by fixing means, in particular by a screw-bolt.

According to FIG. 1, at its end remote from the connection component 3 the control arm 2 has a second mounting designed identically to the mounting 4, by means of which the control arm 2 can be articulated on the vehicle side to a vehicle body and/or an auxiliary frame of the vehicle (the latter not shown here).

Figure 2:
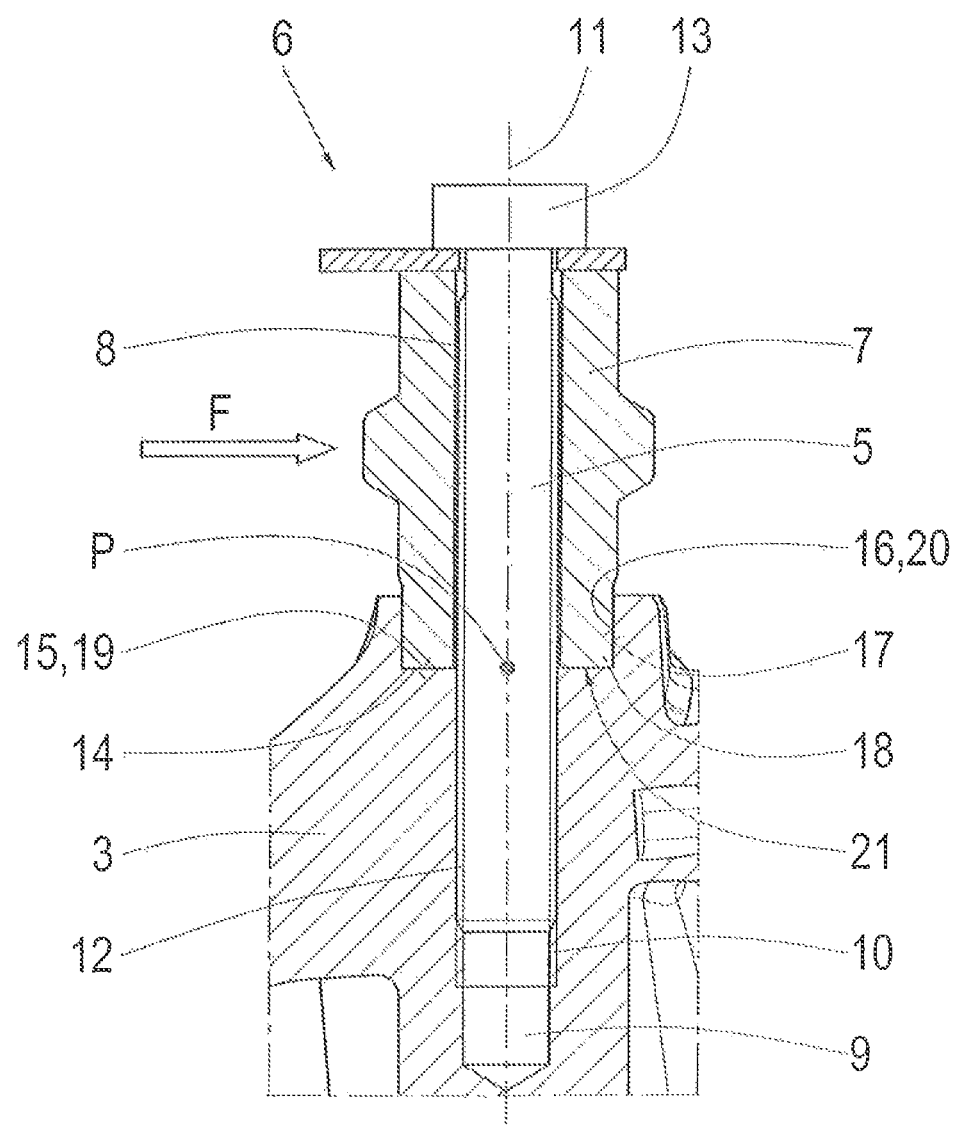
FIG. 2: A detailed view of the attachment area of the component connection, seen in cross-section, according to a first example embodiment.
Figure 3:
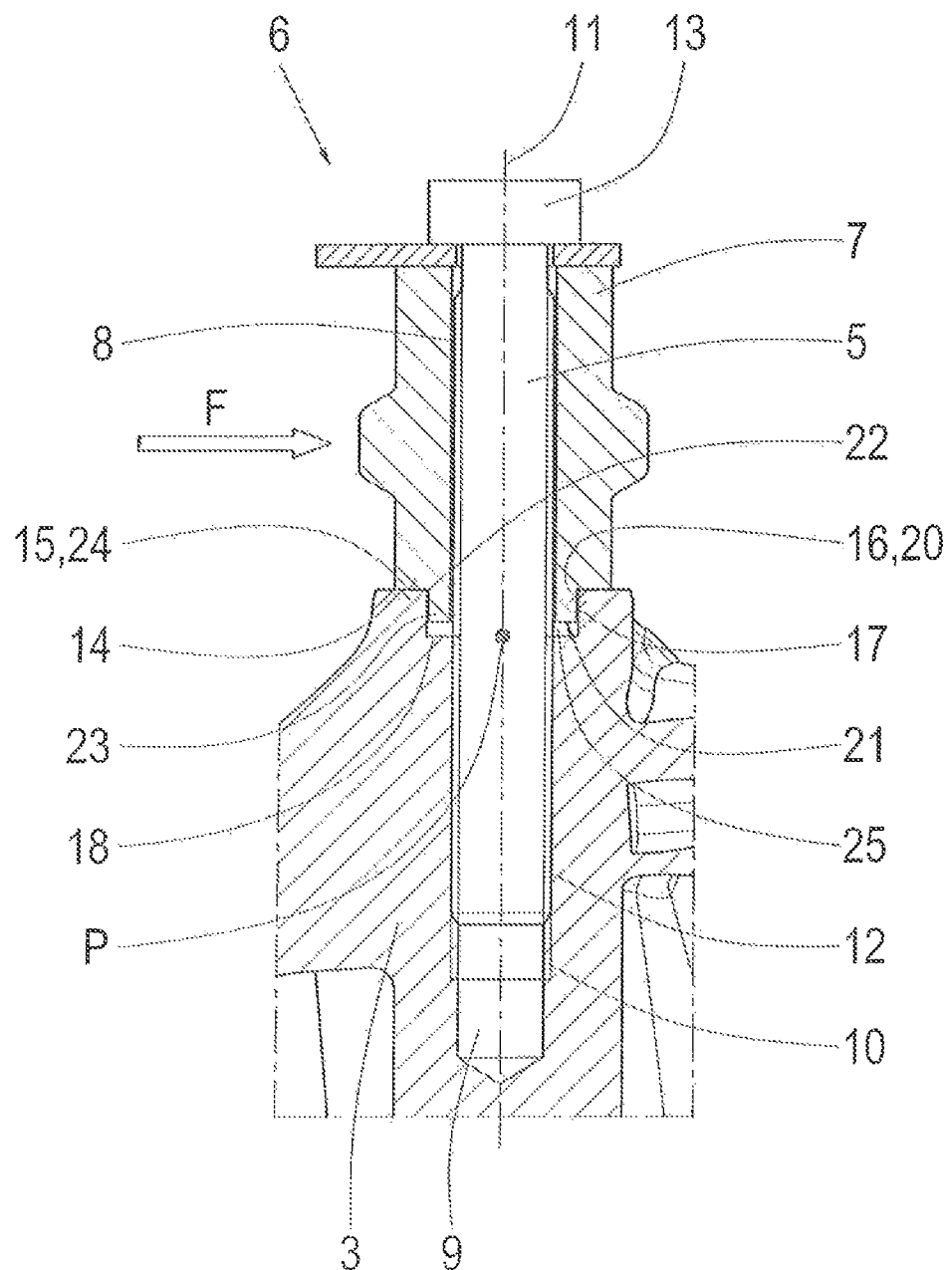
FIG. 3: A detailed view of the attachment area of the component connection, seen in cross-section, according to a second example embodiment.

FIGS. 2 and 3 each show a detailed view of the connection area 6 shown in FIG. 1, seen in cross-section and representing, respectively, two different example embodiments. For the sake of clarity, the control arm 2 is not shown in these figures. Furthermore, the mounting 4 is reduced to those features that are essential to the invention.

FIG. 2 shows that the mounting 4 arranged in the eye of the control arm 2 in accordance with FIG. 1 comprises an inner sleeve 7 with a through-going opening 8. Furthermore, the connection component 3 has a bore 9 with an internal thread 10. The through-going opening 8 and the bore 9 are directed coaxially to one another and consequently have a common longitudinal axis 11. The inner sleeve 7 and the connection component 3 are braced together in the axial direction, i.e. along the longitudinal axis 11, by the fixing means 5. For that purpose the fixing means 5 extends through the through-going opening 8 of the inner sleeve 7 and into the bore 9 of the connection component 3 arranged coaxially with it.

The fixing means 5 is preferably in the form of a bolt. In the area of its end facing toward the connection component 3, the bolt has an external thread 12 by means of which the fixing means 5 can be screwed into the bore 9. By virtue of the interlocked coupling with the head 13 of the fixing means 5, when the latter is screwed in, the inner sleeve 7 is pressed in the direction toward the connection component 3. During this, a first contact surface 14 of the inner sleeve 7 facing toward the connection component 3 is pressed against an abutment surface 15 of the connection component 3.

As indicated in FIG. 2, transverse forces F act on the inner sleeve 7 perpendicularly to its longitudinal axis 11. These give rise to a torque that acts on the fixing means 5 about a pivot point P, which in connection arrangements known from the prior art results in gaping of the arrangement of the control arm 1 if the transverse force F is large enough. During this, the first contact surface 1 is raised clear of the abutment surface 15 on one side.

To counteract such a gaping effect, the connection component 3 comprises a supporting surface 16. The inner sleeve 7 contacts this over a second contact surface 17. Relative to the abutment surface 15, the supporting surface 16 is inclined, in particular at 90°, in such manner that by means of it the transverse forces F acting on the inner sleeve 7 can be supported. Thus, as shown in FIG. 2 the transverse force F produces a torque about the pivot point P which is compensated by an oppositely directed torque produced by virtue of the supporting surface 16. Thus, the fixing means 5 is loaded primarily in tension and not by bending.

According to the longitudinal section of the connection area 6 of the component connection 1 shown in FIG. 2, the supporting surface 16 and the second contact surface 17, corresponding thereto, are orientated parallel to the longitudinal axis 11. Thus, the normals to the supporting surface 16 and the second contact surface 17 are orientated in the radial direction, which favors the maximum transverse force support.

To form this supporting arrangement for the transverse forces, FIG. 2 shows that the connection component 3 comprises a recess 18. In this example embodiment the recess 18 is of cylindrical shape. Accordingly it has a circular bottom surface 19 and a cylindrical sidewall 20. With its end facing toward the connection component 3 the inner sleeve 7 extends into the recess 18.

According to FIG. 2 the sidewall surface 20 of the recess 18 forms the supporting surface 16. Against this rests the inner sleeve 7 with its cylindrical outer circumference in the area of its end facing the connection component 3, essentially without any play. Furthermore, in the example embodiment shown in FIG. 2, with its end face 21 the inner sleeve 7 rests flush against the bottom surface 19 of the recess 18. Consequently, the abutment surface 15 and the supporting surface 16 are both on the inside of the recess 18.

The diameter of the recess 18 is larger than the diameter of the bore 9. Moreover, the recess 18 and the bore 9 are arranged coaxially with one another. Thus, the recess 18 and the bore 9 together form a stepped bore. The example embodiment shown in FIG. 2 is particularly suitable when the inner sleeve 7 and/or the connection component are made of aluminum.

FIG. 3 shows an alternative example embodiment of the component connection 1. In the following description of the second example embodiment shown in FIG. 3, the same indexes are used for the same features. Except if explained in detail again, the design and function of such features correspond to those of the features already described in relation to the first example embodiment.

Otherwise than in the example embodiment illustrated in FIG. 2, the second example embodiment shown in FIG. 3 has an inner sleeve 7 with a step 22. The step 22 is formed in the area of the end of the inner sleeve 7 facing toward the connection component 3. Thus, the step 22 forms an engagement section 23 of reduced diameter on the component side, which is pushed into the recess 18.

A further difference from the first example embodiment shown in FIG. 2 is that the first contact surface 14 is arranged a distance away from the end face 21 of the inner sleeve 7 in the axial direction. Furthermore, the abutment surface 15 corresponding to the first contact surface 14 is outside the recess 18. Thus, the abutment surface 15 is formed by an outer surface 24 of the connection component 3.

The distance in the axial direction between the end face 21 of the inner sleeve 7 and its first contact surface 14 is smaller than the axial depth of the recess 18. Consequently, a free space 25 is formed between the end face 21 of the inner sleeve 7 and the bottom surface 19 of the recess 18. This ensures that the abutment surface 15 and the outer surface 24 or first contact surface 14 are intimately in contact.

Thus, according to the example embodiment shown in FIG. 3 only the supporting surface 16 and the second contact surface 17 corresponding thereto are inside the recess 18. In contrast, the first contact surface 14 and the abutment surface 15 corresponding thereto are outside the recess 18. The example embodiment shown in FIG. 3 is particularly suitable for designs in which both the inner sleeve 7 and the connection component 3 are made of steel.

The present invention is not limited to the example embodiments illustrated and described. Modifications within the scope of the claims are possible, as also are combinations of the features, even if these have been illustrated and described in connection with different example embodiments.

INDEXES

1 Component connection
2 Control arm
3 Connection component
4 Mounting
5 Fixing means
6 Connection area
7 Inner sleeve
8 Through-going opening
9 Bore
10 Internal thread
11 Longitudinal axis
12 External thread
13 Head
14 First contact surface
15 Abutment surface
16 Supporting surface
17 Second contact surface
18 Recess
19 Bottom surface
20 Sidewall
21 End face
22 Step
23 Engagement section
24 Outer surface
25 Free space
F Transverse force
P Pivot point

The invention claimed is:

1. A component connection for a wheel suspension of a motor vehicle, the component connection comprising:
a control arm having a mounting at least at one of its ends,
a connection component having a blind bore with an internal thread,
an inner sleeve and the connection component being detachably fixed to one another by a threaded leading end of a fixing means engaging with the internal thread of the blind bore, and a mid section of the fixing means having a pivot point,
the inner sleeve being partially received within a recess of the connection component,
the fixing means pressing, in an axial direction, a first contact surface of the inner sleeve, facing toward the connection component, toward an abutment surface of the connection component, the abutment surface of the connection component defining a plane and the pivot point of the fixing means being coincident with the plane,
the connection component having a supporting surface against which a second contact surface of the inner sleeve rests, and
the supporting surface being perpendicular to the abutment surface in such manner that transverse forces, occurring in a radial direction in an area of the mounting, are opposed by the supporting surface.

2. The component connection according to claim 1, wherein the supporting surface is orientated parallel to a longitudinal axis of the fixing means.

3. The component connection according to claim 1, wherein at least one of:
the connection component has a cylindrical recess into which the inner sleeve extends with its end facing toward the connection component, and
the supporting surface is formed by a cylindrical sidewall of the recess of the connection component.

4. The component connection according to claim 1, wherein at least one of:
the first contact surface is formed on a component-side end face of the inner sleeve, and
the abutment surface, corresponding thereto, is formed by a bottom surface of the recess.

5. The component connection according to claim 1, wherein the first contact surface is arranged a distance away, in an axial direction, from a component-side end of the inner sleeve by virtue of the supporting surface, and the abutment surface, corresponding thereto, is outside of the recess of the connection component.

6. The component connection according to claim 5, wherein a distance, in the axial direction, between the component-side end of the inner sleeve and the first contact surface is smaller than an axial depth of the recess so that a free space is formed between the component-side end of the inner sleeve and a bottom surface of the recess.

7. The component connection according to claim 5, wherein the supporting surface is formed by cylindrical shaft section extending from the component-side end of the inner sleeve, and the abutment surface, a distance away from the component-side end of the inner sleeve, is formed by a step which adjoins the shaft section.

8. The component connection according to claim 1, wherein the first contact surface and the abutment surface corresponding thereto are conically shaped.

9. The component connection according to claim 1, wherein at least one of the inner sleeve and the connection component is made of at least one of steel and aluminum.

10. The component connection according to claim 1, wherein the fixing means extends through the inner sleeve as far as the bore, which is coaxial with the inner sleeve, into which the fixing means is screwed.

11. The component connection according to claim 1, wherein the recess and the bore of the connection component are made together as a stepped bore.

12. The component connection according to claim 1, wherein the component connection is in the form of a single-shear connection.

13. A component connection in combination with a chassis of a motor vehicle, the component connection comprising:
a multi-point control arm having a mounting at least at one of its ends,
a wheel carrier having a blind bore with an internal thread,
an inner sleeve and the wheel carrier being detachably fixed to one another by a threaded leading end of a fixing means engaging with the internal thread of the blind bore, and a mid section of the fixing means having a pivot point,
the inner sleeve being partially received within a recess of the connection component,
the fixing means presses, in an axial direction, a first contact surface of the inner sleeve, facing toward the wheel carrier, toward an abutment surface of the wheel carrier, the abutment surface of the wheel carrier defining a plane and the pivot point of the fixing means being coincident with the plane,
the wheel carrier having a supporting surface against which a second contact surface of the inner sleeve rests, the supporting surface is perpendicular to the abutment surface in such manner that transverse forces occurring, in a radial direction in an area of the mounting, are opposed by the supporting surface, and the component connection couples the multi-point control arm with the wheel carrier.

14. The component connection in combination with the chassis of the motor vehicle according to claim 13, wherein the mufti-point control arm is either a longitudinal control arm or a transverse control arm.

15. A method of producing a component connection for a wheel suspension of a motor vehicle for coupling a wheel-guiding component and a connection component having a blind bore with an internal thread, the component connection having a mounting at least at one end of the wheel-guiding component, an inner sleeve and the connection component being detachably fixed to one another by a threaded leading end of a fixing means engaging with the internal thread of the blind bore, and a mid section of the fixing means having a pivot point, the inner sleeve being partially received within a recess of the connection component, the fixing means presses, in an axial direction, a first contact surface of the inner sleeve toward an abutment surface of the connection component, the connection component has a supporting surface against which a second contact surface of the inner sleeve rests, and the supporting surface is perpendicular to the abutment surface in such manner that transverse forces occurring, in a radial direction in an area of the mounting, are opposed by the supporting surface, the method comprising producing the inner sleeve with at least a fixed outer diameter and the first contact surface, at least one of interlocking and material-merge connecting the inner sleeve to the wheel-guiding component, producing the connection component with at least one recess that serves for the connection to the wheel-guiding component and fits the outer diameter of the inner sleeve, with at least one contact surface and at least one supporting surface, in such a manner that the outer diameter of the inner sleeve in an area of the contact surface and a diameter of the recess are nominally the same size, preparing the connection component and the wheel-guiding component, positioning and holding the wheel-guiding component relative to the connection component in such a manner that longitudinal axes of the wheel-guiding component and the connection component are at least approximately co-aligned and such that at least one of:

the first contact surface contacts the abutment surface, or the contact surface contacts either a sidewall of the recess or the supporting surface, and interlock connecting the connection component to the wheel-guiding component by the fixing means.

16. The method according to claim 15, further comprising joining the wheel-guiding component and the connection component to one another with either a transition fit or an interference fit.

* * * * *